US008032868B2

(12) United States Patent
Bates et al.

(10) Patent No.: US 8,032,868 B2
(45) Date of Patent: *Oct. 4, 2011

(54) STORING AND RESTORING SNAPSHOTS OF A COMPUTER PROCESS

(75) Inventors: Cary Lee Bates, Rochester, MN (US);
Vadim Berestetsky, North York (CA);
Paul Reuben Day, Rochester, MN (US);
John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 840 days.

This patent is subject to a terminal disclaimer.

(21) Appl. No.: 12/103,746

(22) Filed: Apr. 16, 2008

(65) Prior Publication Data

US 2008/0216054 A1    Sep. 4, 2008

Related U.S. Application Data

(63) Continuation of application No. 10/008,864, filed on Dec. 6, 2001, now Pat. No. 7,383,538.

(30) Foreign Application Priority Data

May 15, 2001  (CA) .................................... 2347647

(51) Int. Cl.
*G06F 9/44* (2006.01)
*G06F 11/00* (2006.01)
(52) U.S. Cl. ............................. 717/128; 714/39; 714/45
(58) Field of Classification Search .................. 717/128; 714/39, 45
See application file for complete search history.

(56) References Cited

U.S. PATENT DOCUMENTS

| 5,140,671 | A | * | 8/1992 | Hayes et al. | 706/60 |
| 5,896,536 | A | | 4/1999 | Lindsey | |
| 6,282,701 | B1 | * | 8/2001 | Wygodny et al. | 717/125 |
| 6,311,326 | B1 | * | 10/2001 | Shagam | 717/128 |
| 6,493,868 | B1 | * | 12/2002 | DaSilva et al. | 717/105 |
| 6,510,507 | B1 | * | 1/2003 | Matt et al. | 711/206 |
| 2002/0147965 | A1 | * | 10/2002 | Swaine et al. | 717/124 |

FOREIGN PATENT DOCUMENTS

| WO | 0007100 | | 2/2000 |
| WO | 0122644 | A2 | 3/2001 |

* cited by examiner

*Primary Examiner* — Li Zhen
*Assistant Examiner* — Ryan Coyer
(74) *Attorney, Agent, or Firm* — Roy W. Truelson (57) ABSTRACT

A method to trace a variable or other expression through a computer program is disclosed. A user determines the variable and the conditions upon which activity of the variable will be monitored. As a result of the invention, every time that variable is referenced in a memory operation or other activity by the program and the conditions set forth by the user are satisfied, the state of that variable is saved as a snapshot without interrupting or stopping execution of the program. The snapshots are accumulated in a history table. The history table can be retrieved and the state of the variable in any given snapshot can be restored. Other variables and expressions can be attached to the trigger variable and the states of these other variables at the time of the activity of the trigger variable may also be saved in the snapshot. The method may be incorporated into a program as a tracing device or a program product separate from the logical processing device executing the program.

8 Claims, 10 Drawing Sheets

STORING AND RESTORING SNAPSHOTS OF A COMPUTER PROCESS

CROSS REFERENCE TO RELATED APPLICATION

This is a continuation of pending U.S. patent application Ser. No. 10/008,864, filed Dec. 6, 2001, entitled "Storing and Restoring Snapshots of a Computer Process", which is herein incorporated by reference. This application claims priority under 35 U.S.C. §120 of U.S. patent application Ser. No. 10/008,864, filed Dec. 6, 2001, and also claims priority under 35 U.S.C. §119 of Canadian Application 2,347,647, filed May 15, 2001.

TECHNICAL FIELD

This invention relates generally to the field of computer programs, and more particularly, relates to storing the states of expressions and variables as a computer process executes, and further having the ability to restore those states.

BACKGROUND OF THE INVENTION

An important aspect of the design and development of a computer program is debugging intended to locate and identify errors in a computer program under development. Typically, a programmer uses another computer program commonly known as a "debugger" to debug a program under development. Conventional debuggers typically support two primary operations to assist a computer programmer. A first operation supported by conventional debuggers is a "step" function which permits a computer programmer to process instructions, also known as "statements", one at a time in a computer program and see the results of each instruction upon completion. While the step operation provides a programmer with a large amount of information about a program during its execution, stepping through hundreds or thousands of program instructions can be extremely tedious and time consuming. The programmer may be required to step through many program instructions that are already known to be error-free before a set of instructions to be analyzed are executed.

To address this difficulty, a second operation supported by conventional debuggers is a breakpoint operation, which permits a computer programmer to identify a break point. A break point is a precise instruction at which execution of a computer program is halted. As a computer program is executed by a debugger, the program executes in a normal fashion until a breakpoint is reached, stops execution, and displays the results of the computer program to the programmer for analysis.

Step operations and breakpoints are typically used together to simplify the debugging process. Specifically, a common debugging operation is to set a breakpoint at the beginning of a desired set of instructions to be analyzed, and then begin execution of the program undergoing debugging. Execution halts at a breakpoint and the programmer then steps through the desired set of instructions line-by-line using the step operation. Consequently, a programmer is able to quickly isolate and analyze a particular set of instructions without having to step through irrelevant portions of a computer program.

Most breakpoints supported by conventional debuggers are unconditional meaning that once such a breakpoint is reached, execution of the program is always halted. Some debuggers also support the use of conditional breakpoints, which only halt execution of a program when a variable used by the program is set to a predetermined value at the time such a breakpoint is reached. One significant drawback to conventional breakpoints results from the fact that some instructions in a computer program are executed fairly often for different purposes, and may result in many needless stoppages before a desired stoppage is encountered. This problem is especially pronounced in object-oriented programming (OOP) and other highly modular languages where a single general purpose portion of a computer program may be executed in a number of different situations for different purposes.

With an object-oriented programming language, for example, a program is constructed from a number of "objects," each of which includes data and/or one or more sets of instructions, often referred to as routines or methods that define specific operations that can be performed on the data. A large number of objects may be used to build a computer program with each object interacting with other objects in the computer program to perform desired operations. When one object invokes a particular routine in another object, the former object is often said to be calling the routine in the latter object. Some general purpose objects in a computer program may support basic operations, e.g., displaying information to a user, printing information on a printer, storing or retrieving information from a database, etc. Particularly, these generic type of objects are called by many different objects so that placing a conventional breakpoint in a routine of one of these common generic objects will result in hundreds of unwanted stoppages prior to occurrence of a desired stoppage. Thus, context sensitive breakpoints can be set in certain debuggers to retrieve the sequence of routines in the computer program that are called just prior to reaching the breakpoint, such as in U.S. Pat. No. 6,077,312 entitled "Apparatus, Program Product and Method of Debugging Utilizing a Context Sensitive Breakpoint" issued 20 Jun. 2000, commonly owned by the assignee and herein incorporated by reference in its entirety. Context sensitive breakpoints locate the specific calls in other objects that relate to the desired stoppage in a particular object. This eliminates the extremely time consuming and tedious task of setting each breakpoint and eliminates the risk that not all relevant calls are located so not all desired circumstances for inducing stoppages may be recognized during debugging.

But, setting breakpoints and halting execution of a program undergoing debugging is still onerous. Significant time is spent going through the breakpoints, whether the breakpoints are general or are context specific, as above. Merely watching breakpoints, moreover, does not solve the problem of determining the dynamics of an executing program in which variables and other expressions stored in a memory location may constantly change. These changing variables, moreover, may have either a direct or an indirect impact on other variables and other computer expressions. The state of the art of debugging and trace programs, therefore, simply does not permit a dynamic program to continue to execute while recording only the impact of the program's execution resulting from changes of state of specified computer expressions.

Therefore, a significant need continues to exist for an improved manner of debugging computer programs, specifically in the area of identifying specific variables or memory locations which are used by the program undergoing debugging, and being able to restore the state of those memory locations at different points in the program.

SUMMARY OF THE INVENTION

These needs and others that will become apparent to one skilled in the art are satisfied by a method of tracing the activity of an expression, comprising the steps of: specifying a machine-implemented process in which a trigger expression is to be traced; specifying the trigger expression to be traced in the machine-implemented process; storing the state of the trigger expression when it is active within the machine-implemented process without interrupting the process; and restoring the state of the trigger expression when requested.

A condition may be imposed onto the trigger expression such that the state of the trigger expression is stored only when the condition is satisfied. In any event, the step of storing the state of the trigger expression may comprise creating a history of the trigger expression which is all the different states of the trigger expression whenever it was active. The history may be displayed such that the state of the trigger expression each time the trigger expression was active can be displayed separately.

The trigger expression is one which results in an L value during the machine-implemented process. The activity may be a call to a memory location of the trigger expression, such as a Read and/or a Write.

Attached expressions may be specified such that the state of the attached expressions, if any, are also stored when the trigger expression is active; and the state of the attached expressions may be restored when requested.

The machine-implemented process may be a computer program, such as included in an object level trace program. The computer program may also be included in a debug program.

The invention may also be a method of tracing the activity of an expression in an executing computer program, comprising the steps of: specifying the computer program and specifying a trigger expression resulting in an L value and any optional attachment expressions which are to be traced during the execution of the computer program; imposing a condition onto the trigger expression; storing the state of the trigger expression and any optional attachment expressions when the computer program has accessed a location in memory pertaining to the trigger expression and the conditions are satisfied to create a snapshot, the step of storing accomplished without interrupting the process; creating a profile of the trigger expression comprising storing each snapshot; displaying the profile such that each snapshot can be displayed separately; and restoring the state of each snapshot, when requested.

The invention is also a tracing device, comprising: a memory functionally connected to the digital logic device capable of executing a sequence of instructions; a program to monitor the activity of an expression during the execution of the sequence of instructions; a snapshot of the state of the expression every time the expression is active during the execution of the sequence of instructions; a history stored in the memory, the history being a plurality of snapshots; a state restorer which restores the state of the expression in a snapshot; and a user interface by which a user may interact with the program, a snapshot, and the history. The tracing device may be incorporated into an debug program to debug the sequence of instructions; or into an object trace program. The tracing device may further comprise an attachment expression profiler which stores the state at least one attachment expression with each snapshot. The tracing device and the digital logic device may be incorporated into the same computer; alternatively, they may be separate units connected by a data communications link.

The invention may also be considered a processing device to trace the activity of an expression in a computer device, comprising: a processor; a memory functionally connected to the processor; a first computer program executing by the processor in which the expression is active; a second computer program to trace the activity of the expression within the memory during the execution of first computer program; a snapshot which stores the state expression every time the expression is active during the execution of the first computer program; an attachment expression profiler which stores the state at least one attachment expression with each snapshot; a history stored in the memory, the history being a plurality of snapshots; a display unit to display the history to a user; and an input device by which the user can input the expression to be traced.

The invention may also be a profiler to record the profile of a particular expression/variable within a program executing within a logical processing device, the profiler comprising: means to choose the particular expression/variable in a program executing within the logical processing device; means to record a snapshot of the particular expression/variable whenever the program addresses a memory location of the particular expression/variable without interrupting the program; means to collect a plurality of snapshots into a profile of the particular expression/variable, each snapshot corresponding to each time the program addressed the memory location of the particular expression/variable; and means to display the profile of the particular expression/variable. There may also be means to set at least one attachment expression active within the program; means to record the state of the at least one attachment expression whenever a snapshot of the particular expression/variable is taken; means to attach each state of the at least one attachment expression to the snapshot of the particular expression/variable when taken; and means to display the profile of the at least one attachment expression to a user. The profiler may further have means to delete the profile; and/or means to change the particular expression/variable; and/or means to change the at least one attachment expression.

The invention also embodies a program of machine readable instructions executable by an electronic processing apparatus to perform method steps for operating an electronic processing apparatus, the program comprising the steps of: initiating a user interface to exchange data input/output with a user and an electronic processing apparatus; requesting a trigger expression from a user; requesting a program identification of a program in which the trigger expression is to be traced during the program's execution; storing the state of the trigger expression each time a memory operation occurs to the trigger expression during the execution of the identified program without interrupting or otherwise stopping execution of the identified program as a snapshot; and maintaining the capability to restore each snapshot and display each snapshot to the user. The user may further be requested to assign conditions to the trigger expression whereupon when the conditions are satisfied, the snapshot is stored. Further, the user may be requested to indicate an attached expression whose states are also stored in a corresponding snapshot whenever a snapshot is stored.

BRIEF DESCRIPTION OF THE DRAWING

The novel features believed characteristic of the invention are set forth in the claims. The invention itself, however, as well as a preferred mode of use, objects and advantages thereof, will best be understood by reference to the following detailed description of an illustrative embodiment when read in conjunction with the accompanying Drawing, wherein:

DETAILED DESCRIPTION OF THE PREFERRED EMBODIMENTS

Figure 1:
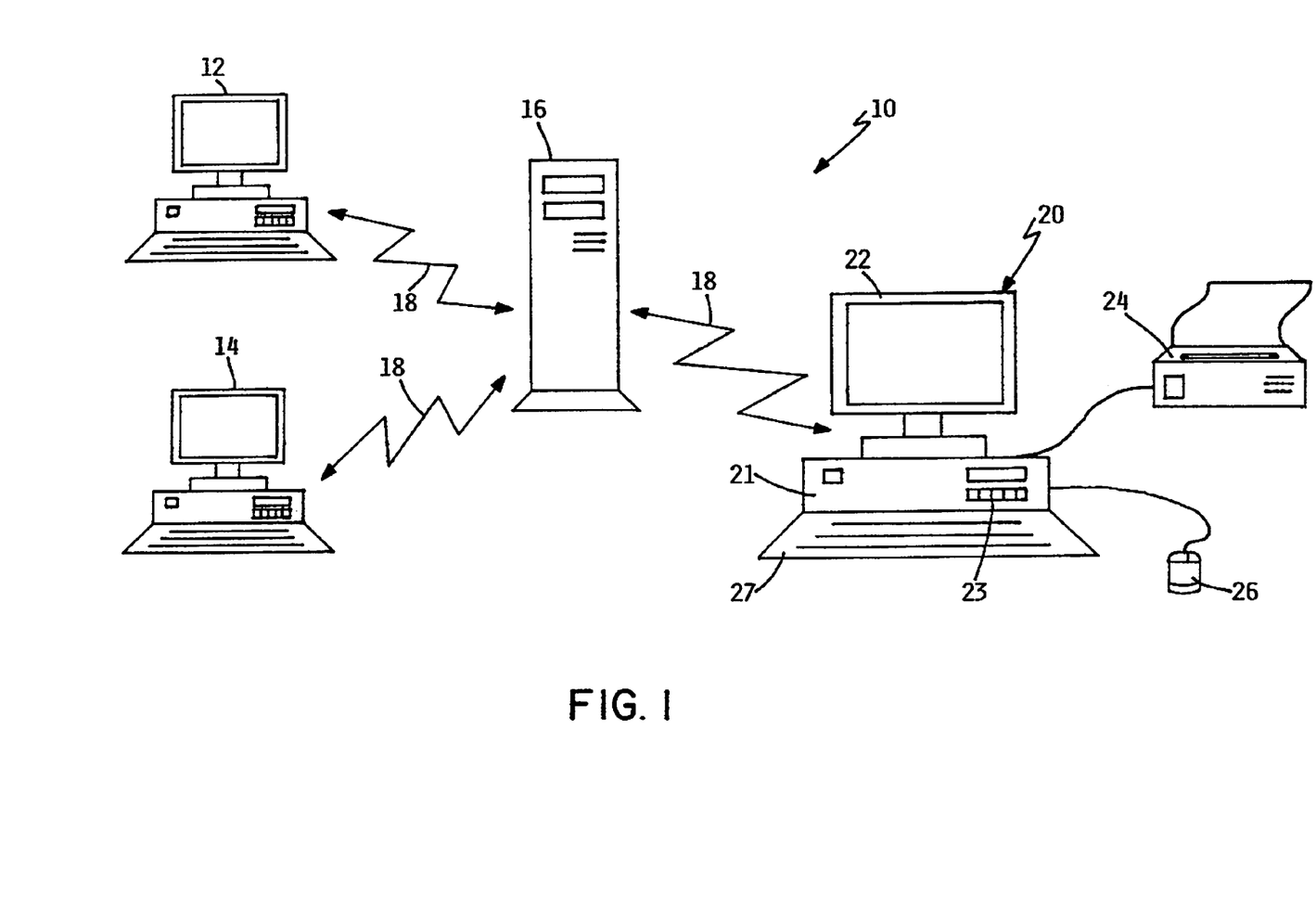
FIG. 1 is a high-level block diagram of a server computer system capable of implementing the preferred embodiment of the invention.

Referring to the Drawing, wherein like numbers denote like parts throughout the several views, FIG. 1 illustrates a computer system 10 consistent with the invention. Computer system 10 is illustrated as a networked computer system including one or more client computers 12, 14 and 20, e.g., desktop or PC-based computers, workstations, etc., coupled to server 16, which could also be a PC-based server, a minicomputer, a midrange computer, a mainframe computer, etc., through a network 18. Network 18 may represent practically any type of networked interconnection, including but not limited to local-area, wide-area, wireless, and public networks such as the Internet. Any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices, e.g., a mouse 26 and keyboard 27, among others. Server computer 16 may be similarly configured, albeit typically with greater processing performance and storage capacity, as is well known in the art.

Figure 2:
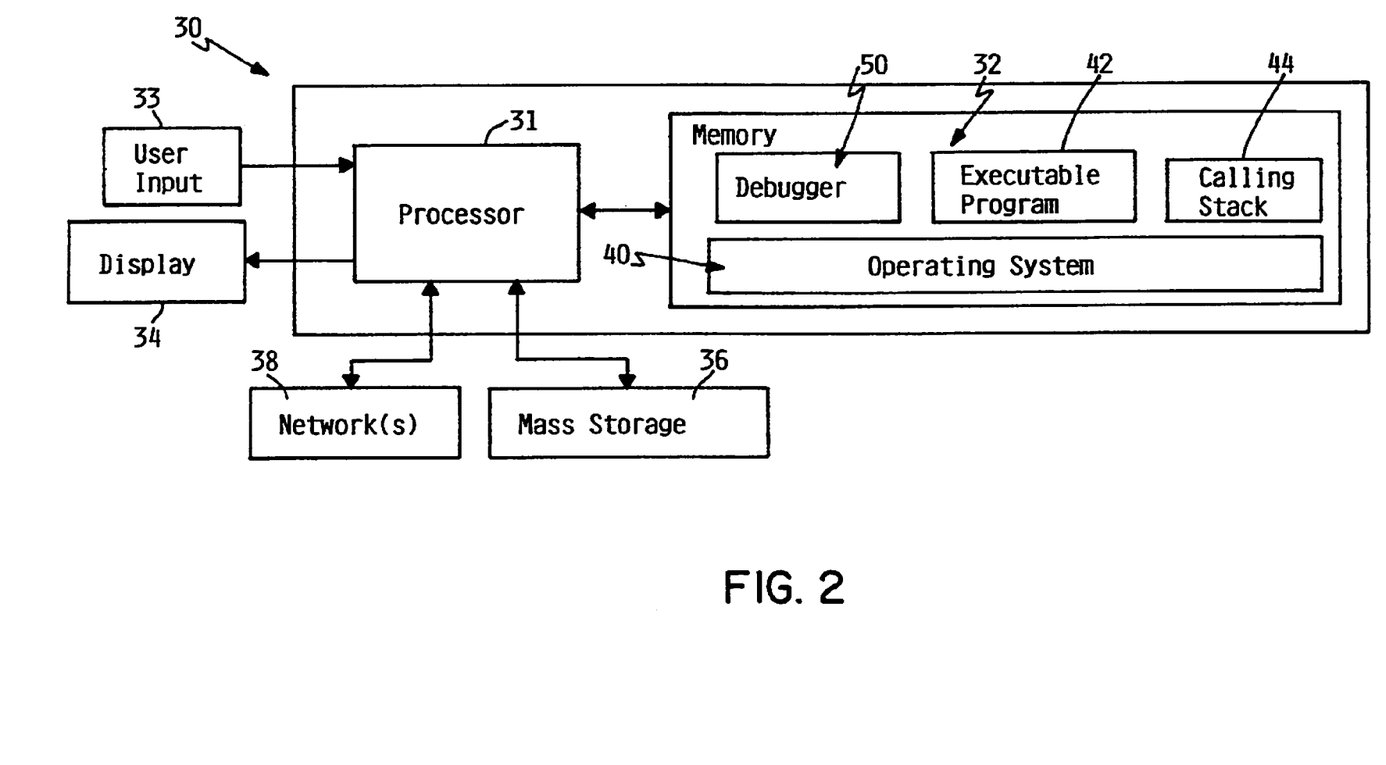
FIG. 2 is a simplified representation of a computer network capable of implementing the preferred embodiment of the invention.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer, e.g., similar to computers 12,14 and 20 of FIG. 1, a server computer, e.g., similar to server 16 of FIG. 1, a portable computer, an embedded controller, etc. Apparatus 30 may be coupled in a network as shown in FIG. 1, or may be a stand-alone device in the alternative. Apparatus 30 will hereinafter also be referred to as a computer although it should be appreciated the term "apparatus" may also include other suitable programmable electronic devices consistent with the invention.

Computer 30 typically includes at least one processor 31 coupled to a memory 32. Processor 31 may represent one or more processors or microprocessors, and memory 32 may represent the random access memory (RAM) devices comprising the main storage of computer 30, as well as any supplemental levels of memory, e.g., cache memories, non-volatile or backup memories, programmable or flash memories, read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33, e.g., a keyboard, a mouse, a trackball, a joystick, a touchpad, and/or a microphone, among others, and a display 34 such as a CRT monitor, an LCD display panel, and/or a speaker, among others. It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive e.g., a CD drive, a DVD drive, etc., and/or a tape drive, among others. Furthermore, computer 30 may include an interface with one or more networks 38, e.g., a LAN, a WAN, a wireless network, and/or the Internet, among others, to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes various computer software applications, components, programs, objects, modules, etc., such as an executable program 42, a calling stack 44, a debugger 50, among others. The debugger software application 50 is resident in memory 32 for the purpose of debugging one or more executable computer programs, e.g., executable program 42. A calling stack 44 associated with executable program 42 is utilized by operating system 40 during the execution of program 42. These and other various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as computer programs or simply programs. The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention.

While the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks, e.g., CD-ROM's, DVD's, etc., among others, and transmission type media such as digital and analog communication links. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. The exemplary environments illustrated in FIGS. 1 and 2 are not intended to limit the present invention. Indeed, those skilled in the art will recognize that other alternative hardware and/or software environments may be used without departing from the scope of the invention.

Routines, often referred to as methods, procedures, and functions, are typically sequences of instructions or statements in a computer program that may be invoked to perform predetermined operations on a computer. The calling history for a computer program is typically maintained by an operating system using a data structure such as a calling stack that maintains information regarding the sequence of routines that are called during the execution of the computer program. A calling stack is a first in-first out (FIFO) data structure. In response to a routine call from a first routine to a second routine, an operating system will generally "push" onto the top of the calling stack an entry that identifies both the first routine, as well as the specific instruction or statement in that routine from which the routine call was made or, alternatively, the instruction or statement in that routine to which control should be returned upon completion of the second routine. The second routine is then executed, and if that routine calls an additional routine, an entry relating to that routine call is also added to the stack. As routines terminate in execution, entries from the calling stack are then "popped" from the top of the stack and the information therein analyzed to determine the routine and instruction therein where control should be returned.

Figure 3A:
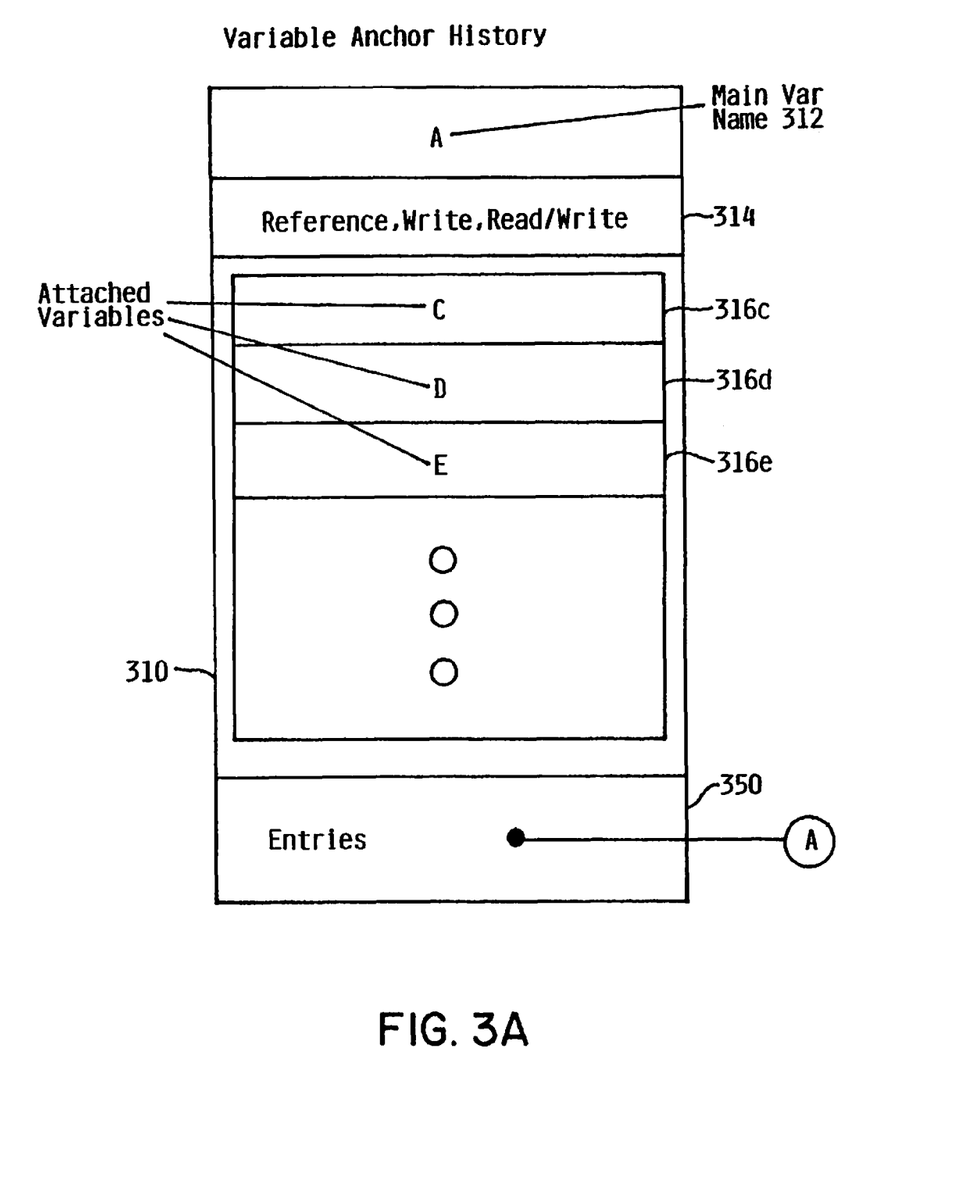
FIG. 3 is a representation of a variable anchor history having a number of snapshots of a variable as an example of a computer expression traced through a computer process.
Figure 3B:
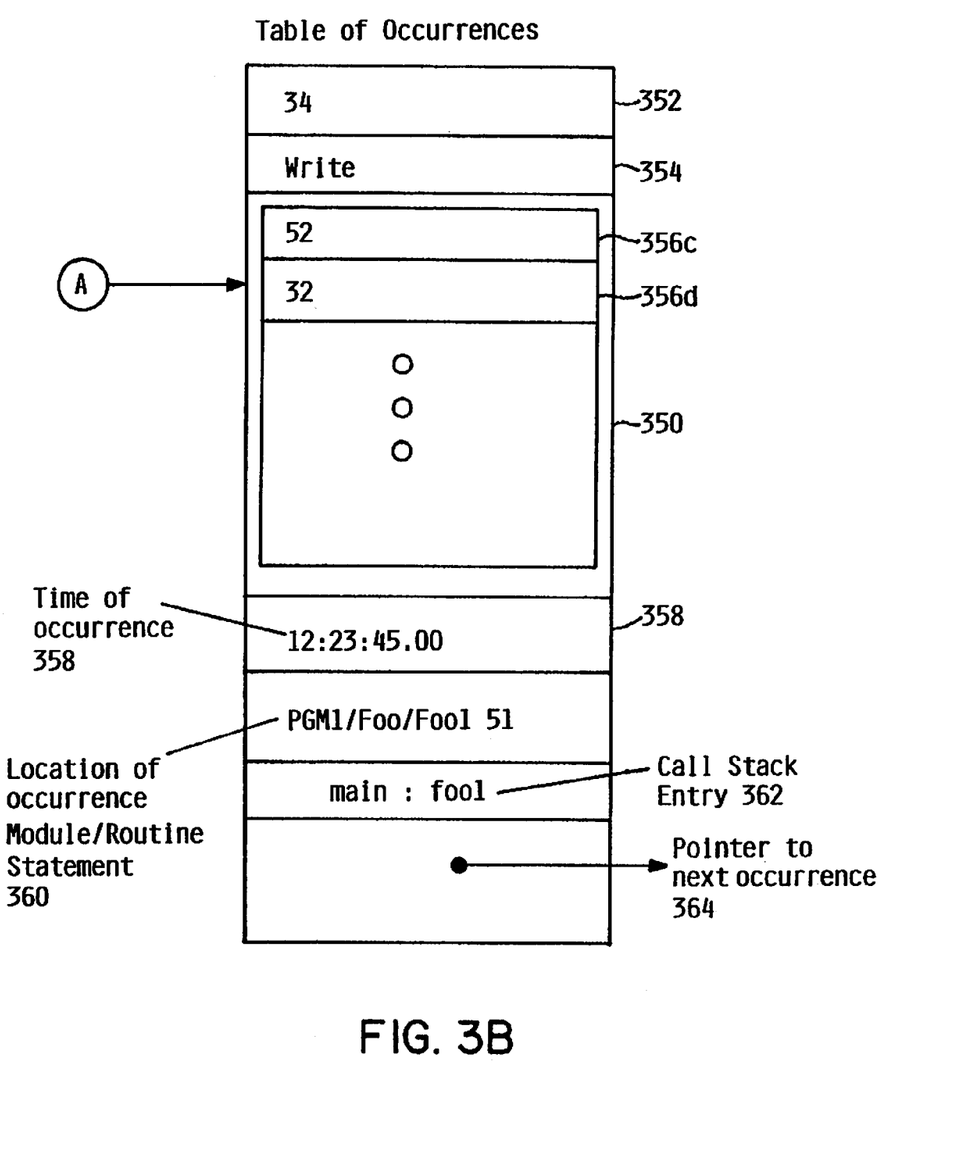

In accordance with features of the invention, as will be described, greater freedom and flexibility is granted to the computer programmer so she/he can indicate a trigger variable/expression whose state is saved every time the trigger variable is active within the program, more specifically whenever an executed instruction changes or addresses the state of the trigger variable/expression. When the user specifies a trigger variable or expression, a special watch breakpoint is set to that variable/expression. When the trigger variable/expression is active or otherwise addressed during program execution, execution is not stopped but rather features of the inventive process herein are triggered to store the point in the program at which the activity occurred, the variable's/expression's values and/or selected attributes, referred to as a snapshot. The user may further specify additional variables/expressions and execution attributes to be attached to the trigger variable/expression whose states are also saved in the snapshot. FIGS. 3a and 3b provide an illustration of a trigger variable/expression profile, referred to as a variable anchor history 310 and a table of occurrences 350 having an entry for each snapshot, respectively. The history 310 and the table of occurrences represent data stored from the execution of a program which is undergoing debugging by a debugger program.

In the preferred embodiment, the features of the invention herein will be incorporated in a debugger program; alternatively, however the process and features of the invention as described herein can also be a stand-alone computer program which will record a history of a computer expression through an executing computer program or process. The variable anchor history 310 is preferably stored in the RAM and could easily be saved and stored to main memory. Among the features of the variable anchor history 310 include the trigger variable's name 312. Represented here as a variable with the name "A", the invention is actually intended to cover an activity to an addressable memory location used by a computer program; hence the inventive process herein is expanded to include computer expressions resulting in an L value, i.e., a value that can be expressed as being left of an equal sign in a logical or arithmetic expression. Examples of expressions may include an array element, a pointer expression, a substring expression, etc., as well as variables.

Also stored in the history table 310 are three choices of memory operation, as an example of an activity, which had been performed on the trigger variable/expression 312. Reference is a matter of just referring to the memory address associated with the variable/expression A; Write means that the program writes a value to the memory location of A; and Read/Write means that the program reads from or writes to the memory location of A.

The attached variables that the user specified may be further stored in the history table 310; attached variables C 316c, D 316d, and E 316e are examples of other variables/expressions whose state can be stored and restored when an event happens to a trigger variable/expression. Section 350 of the history table 310 contains the tables of occurrences in which the trigger variable/expression A has been referenced or written or read by the program undergoing the tracing and/or the state history of the trigger variable/expression and/or one or several of the attached variables/expressions C, D, and/or E has been saved.

One such table of occurrences 350 is shown in FIG. 3b. In the preferred embodiment, there is one snapshot or table of occurrence each time the trigger variable/expression A 312 is referenced or written or read by the program undergoing the tracking. Block 352 represents the value of A at the time it is referenced, or read, or written, and in this case A has an integer value 34. Of course, while shown here in decimal value, the value of A could be written hexadecimal, digital 0 or 1, or any other representation. The next section 354 contains the memory operation which was performed on the variable/expression A; in this case the value of A was written to the memory location allocated to A. Blocks 356c and blocks 356d store the values of the attached variables C and D, respectively. The time of the occurrence could be stored in block 358. Block 360 represents the statement of the program in which the variable/expression A was written to. In this case, statement 51 of the routine Foo1 of the module FOO performed a write operation to the memory location of A to store a value of 34. Block 362 is the name of the call stack. Block 364 points to another entry in the history table which could be another table of occurrence of similar structure of that shown in FIG. 3b.

Figure 4:
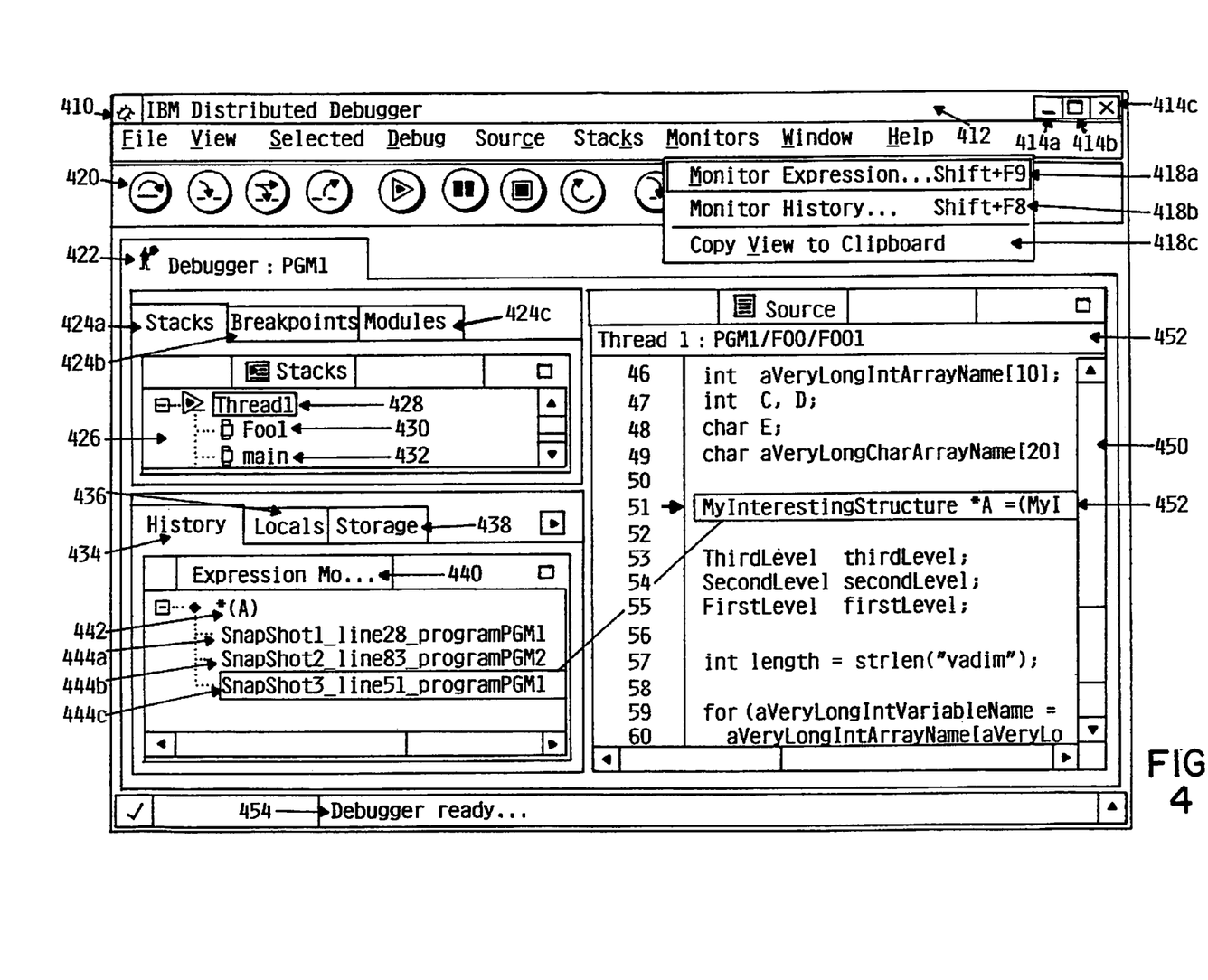
FIG. 4 is a representation of a graphical user interface to implement the method by which a trigger variable/expression can be traced through a computer process.

FIG. 4 is a representation of a graphical user interface that could be implemented to call the method by which a trigger variable/expression and associated execution snapshots could be presented to the user and a corresponding process execution state can be restored. While the user interface shown is a graphical one capable of display on a computer monitor, a flat panel display, etc. it is fully intended that the user interfaces disclosed herein may cover any visual, audible, or tactile method and device with which to communicate and interact with a user. As mentioned earlier, the method herein could be implemented in a distributed debugger program as shown in the title bar 412 which also shows the typical minimize, maximize, and close icons 414a, 414b, and 414c, respectively, in the upper right corner. Below the title bar 412 is the pull down menu bar 416. The pull down menu of Monitors is shown, with the options Monitor Expression 418*a*, Monitor History 418*b*, and Copy View to Clipboard 418*c* shown. The rest of the screen 410 shows the results of selecting the Monitor Expression 418*a* option of the pull down menu. Application toolbar 420 is shown beneath the pull down menu bar 416.

Specific information shown in the graphical user interface of FIG. 4 is the name of the program PGM1 422 which is/was debugged. The lower two-thirds of FIG. 4 then pertains to this program. The debug program offers three tabs to switch between the following panels: Stacks 424*a*, Breakpoints 424*b*, and Modules 424*c*. The Stacks panel displays the call stack of every thread currently executing in the computer process under debug. In the example depicted in FIG. 4, we see that call stack of Thread 1 428 consists of routines Foo1 430 and main 432 in that order. The Modules panel displays the Program/Module/Procedure hierarchy of the debug sessions. The Breakpoints panel displays various types of active breakpoints set by the user within this debug session, e.g., line breakpoints, watch breakpoints, procedure entry breakpoints, procedure exit breakpoints.

Below the block of the Stacks 426 are three additional tabs used to switch between the following panels: History 434, the Locals 436, and Storage 438. Storage allows the user to monitor contents of the storage for the computer process under debug. Locals displays variables that are local for each individual thread. The History panel 442 has been selected and the history of the expression A as it was referenced during the execution of the program PGM1 is displayed. History 442 shows a listing of three snapshots 444*a*, 444*b*, 444*c*. Again, a snapshot refers to the execution state of the program at a specific statement in the program at which the trigger variable/expression was referenced. During the execution of the PGM1, the expression A was referenced three times: SnapShot1 444*a* occurred on line 28 of program PGM1; SnapShot2 444*b* occurred on line 83 of PGM2; and SnapShot3 444*c* occurred on line 51 of PGM1.

To the right in FIG. 4 is another view 450 which presents the source code for the snapshot highlighted in the History window 442. As can be seen in the window 450, the thread and program are identified in the identification bar 452 as Thread1: PGM1/FOO/Foo1. Immediately below the identification bar 452 is the actual code and the line number of the statement which referenced the variable A and was saved as SnapShot 3 block 444*c*. Specifically, variable A was referenced on line 51 of PGM1 in the procedure Foo1, and this statement allocates memory for the expression A. The graphical user interface indicates in bar 454 at the bottom that the debugger is ready for additional debug actions.

Figure 5:
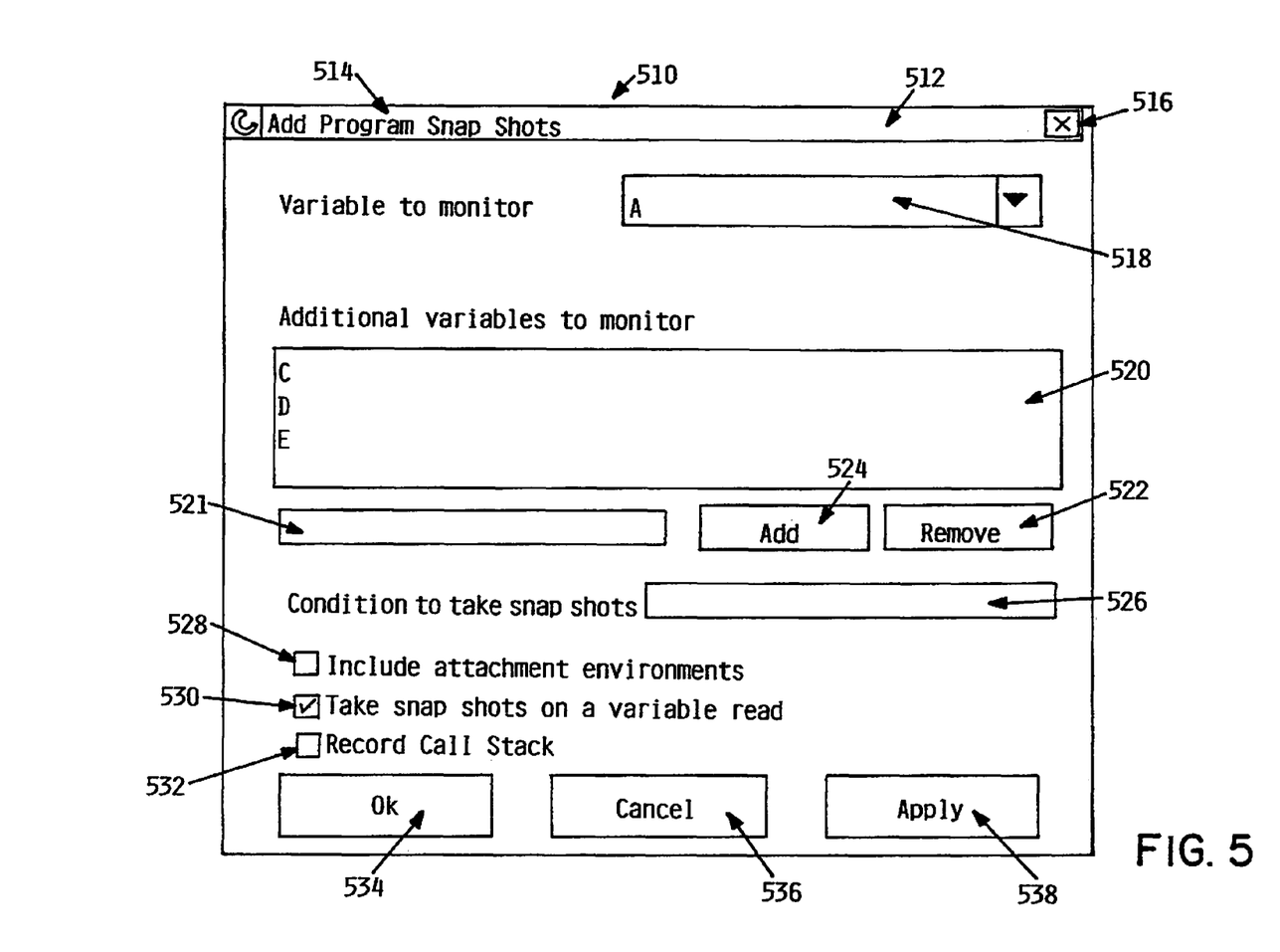
FIG. 5 is a representation of a graphical user interface of selection of a trigger variable/expression and attached variables/expressions and execution attributes that can be traced through a computer process.

FIG. 5 is a representative example of a graphical user interface 510 to indicate a trigger variable/expression, attached variables/expressions, and execution attributes that can be recorded during computer program execution and thereafter restored. This particular graphical user interface 510 could be invoked by the user through the debugger application that incorporates features of the invention. In FIG. 5, there is a title bar 512 which indicates the function of the graphical user interface; in this case, the function is to select variables/expressions to monitor through a program, referred to as "Add Program SnapShots" 514. Of course, there is an icon at the far right of the title bar 512 to close the program. In block 518, the user may enter the trigger variable/expression to monitor or trace through the program to be debugged. Attached variables/expressions are entered in the section 520. The user can add new variables/expressions by entering them in the entry field 521 and pressing "Add" button 524. By selecting a variable/expression in section 520, the user can update or remove a particular variable/expression from the list, as in blocks 522 and 524.

If the trigger variable/expression is referenced very frequently throughout the program under inspection, taking snapshots for every such reference might become somewhat costly. In such scenarios the user quite often knows specific conditions that cause a problem in question, e.g., certain range for the loop index, or certain values for the variable/expression, such as A>900, A is True, etc. She/he may limit the number of snapshots taken by identifying such conditions and entering them in the "Conditions to take snapshots" field in block 526. The graphical user interface 510 further allows the user to indicate if she/he wishes the program to include attachment environments, such as local variables, registers, storage contents, etc. as in block 528; to take snapshots on a variable read as in block 530; and/or to record the call stack as in block 532. Then, as is common with graphical user interfaces, the user may then enable the program to accept the input as in OK, block 534; to CANCEL as in block 536; or to APPLY as in block 538.

Figure 6A:
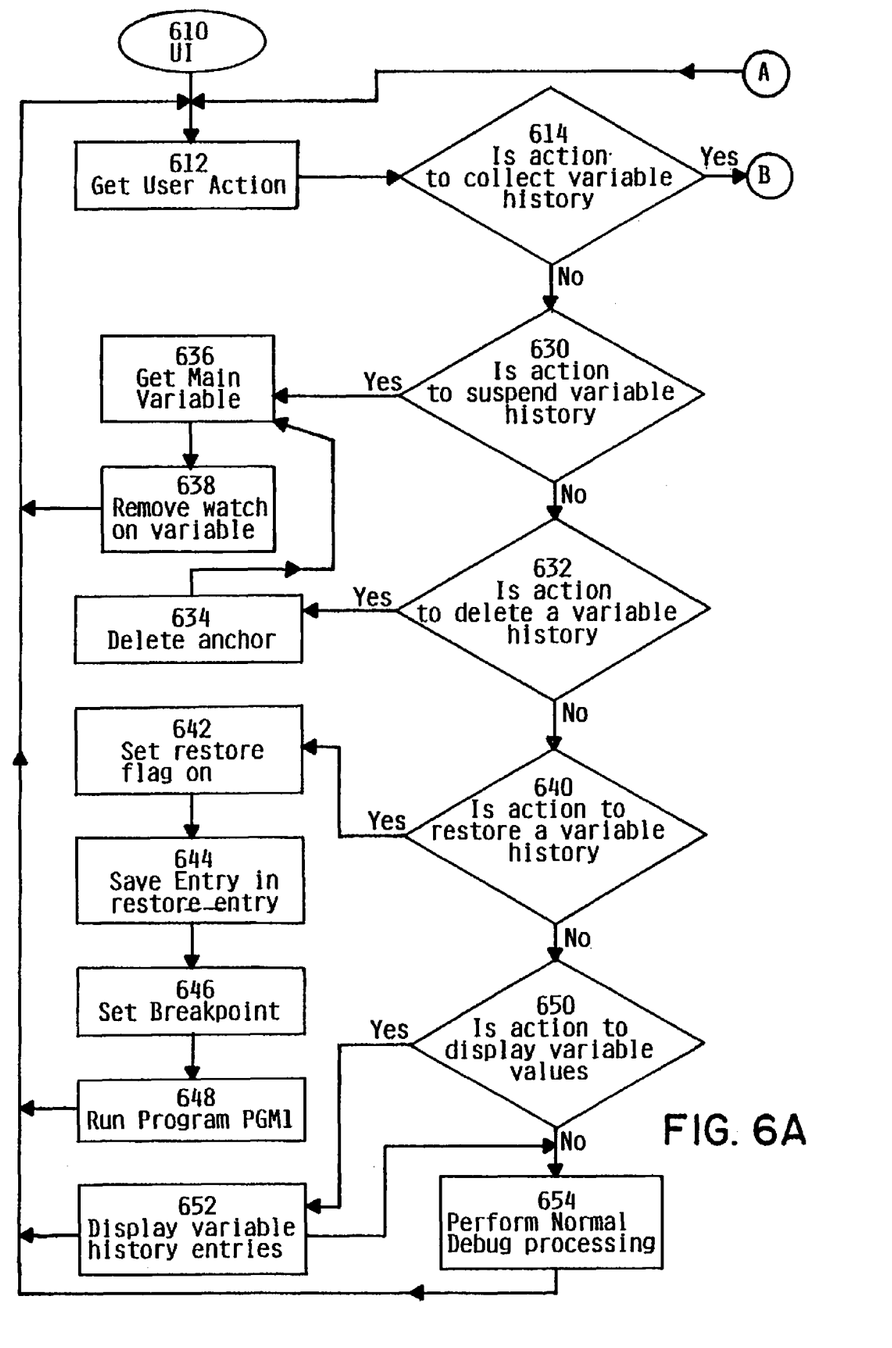
FIG. 6 is a flowchart illustrating the program flow of the method to trace a variable/expression through a computer process.
Figure 6B:
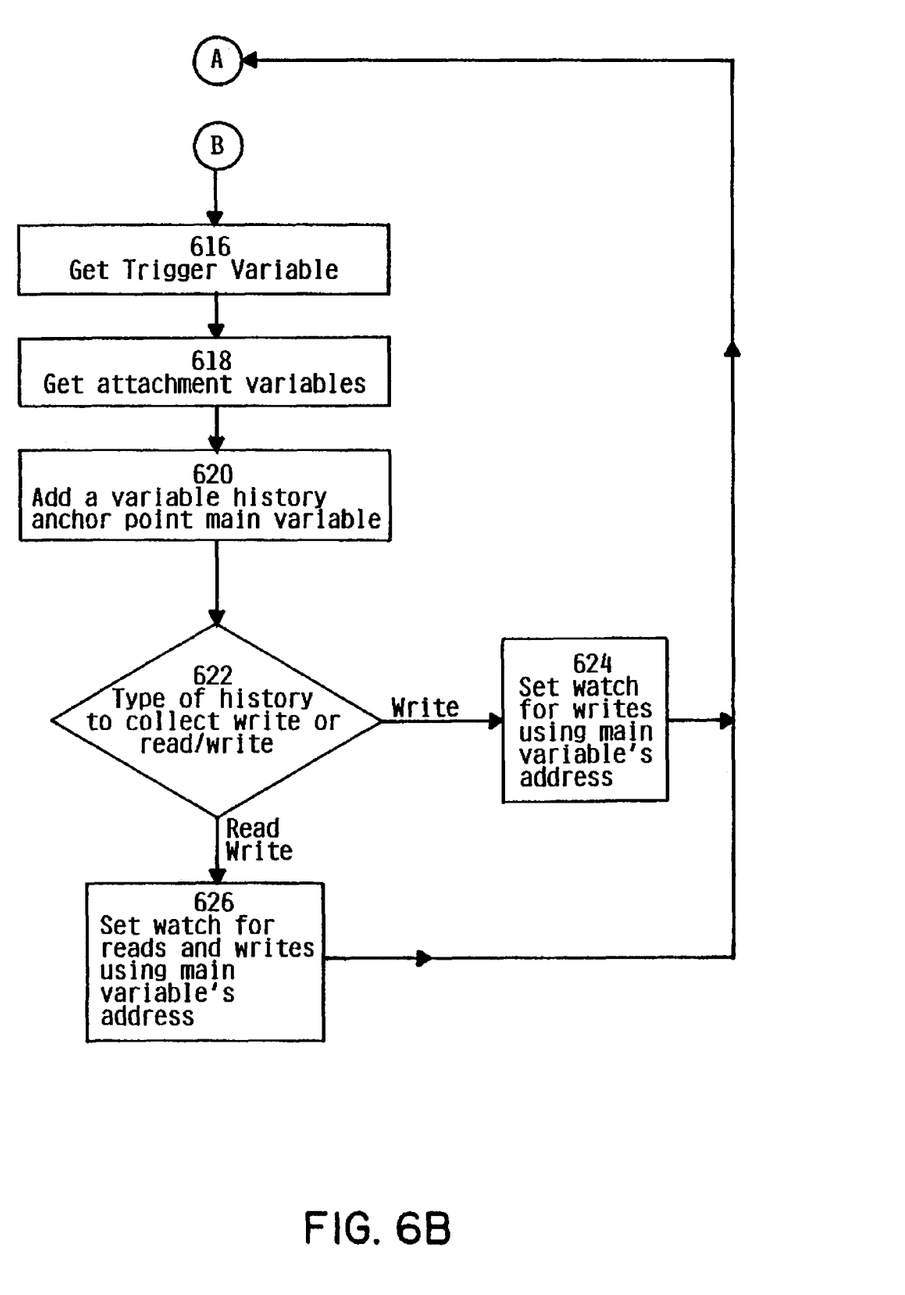

FIG. 6 is a simplified flow chart of the program flow of the method by which a user interacts with the program to trace a trigger and other variables/expressions through a program to be debugged. In step 610, the user interface of FIG. 5 is invoked and the user initiates the inventive process herein with an action as in step 612. Step 614 inquires if the user action indicates that she/he wants to collect the history of a trigger variable/expression. If the response is yes, then the parameters to establish the watch history are obtained through the user interface of FIG. 5 as in steps 616, 618, and 620. The user inputs what operation of the program is to be monitored with respect to the trigger variable/expression in step 622. If the inventive process herein is to monitor and store the history of every time the program writes to the memory location associated with the trigger variable/expression established in step 616 above, then the watch is set for writing to that expression as in step 624. Alternatively, if the user has indicated that she/he wishes to watch and store the history every time the program reads and writes to the memory location associated with the trigger variable/expression, then in step 626, that process is established and the process loops back to step 612 to await another input from the user.

In step 614, however, if the user does not wish to establish or collect the history of a trigger variable/expression as it is traced through a program, then in step 630, the process inquires if the user wishes to suspend tracing a particular variable through the program. If the response is no, the program determines if the user wishes to delete the history associated with a trigger variable/expression as in step 632. If the response is to delete the history then in step 634 the trigger and the attached variables'/expressions' history and snapshots or table of occurrences, as shown in FIGS. 3*a*, 3*b*, and 4 are deleted. The process then obtains the trigger variable/expression, as in step 636, to remove the watch of that trigger variable/expression as in step 638.

If, however, in step 632, the action is not to delete a variable's/expression's history, then in step 640, there is an option to restore the state of the trigger variable/expression and any attached variables/expressions, a unique feature of the invention herein. First, the restore flag is set in step 642. Then in step 644, the entry is saved. In step 646, the execution of the program is set to the line where a breakpoint occurred, as in line 51 shown in FIG. 4 and the program undergoing the debug procedure is run from line 51 as in step 648. According to this feature of the invention, the states of the trigger variable/expression is thus restored and the user can use any number of further debug operations to determine if a problem exists in the program's execution at the restored state.

In step 640, if the action is not to restore the state of a trigger variable/expression, the process inquires next if the action is to display the variable's/expression's values, as in step 650. If so, then the variable's/expression's history is displayed in step 652. Otherwise, normal or alternative debugging operations may proceed as in step 654.

Figure 7A:
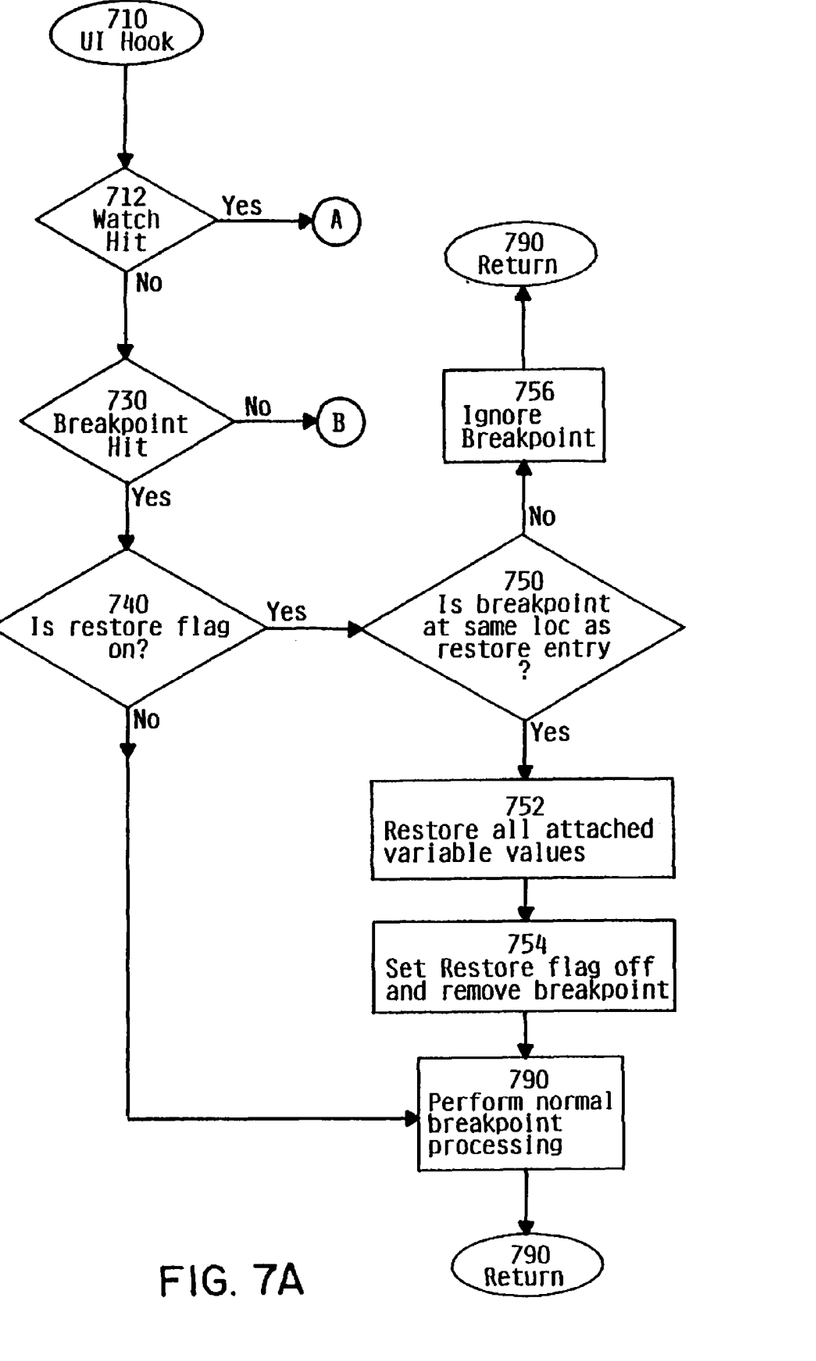
FIG. 7 is a flowchart illustrating the program flow of the method to retrieve the history of a trigger variable/expression as it changes state in a computer process.
Figure 7B:
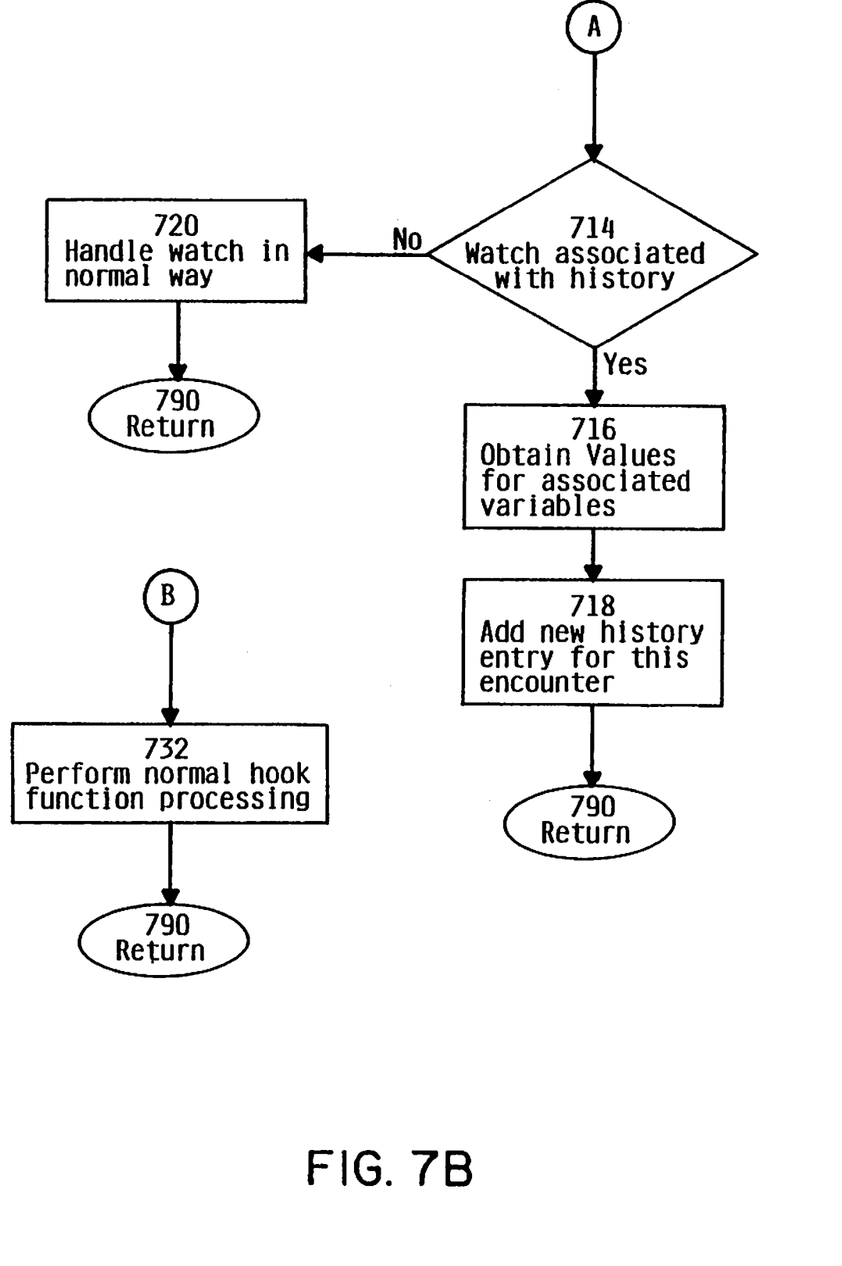

FIG. 7 is a simplified flow chart of the program flow of the method to retrieve the history of a trigger and any attached variable/expression as it was traced through a computer process in accordance with an embodiment of the invention. In FIG. 7, the User Interface (UI) Hook is invoked whenever a watchpoint or a breakpoint occurs pertaining to the trigger variable/expression set forth in the graphical user interface of FIG. 5. In step 712, the process determines if the program undergoing debugging has reached a watchpoint of the trigger variable/expression. If yes, then in step 714, the process determines if the user wants to store the history associated with the watch. Again, if yes, then in step 716, the values of the trigger variable/expression and any attached variables/expressions are stored and a new snapshot is included in the history table for this occurrence, as in step 718. The process then returns to continued execution of the program undergoing the debugging if there are more statements to execute, as in step 790.

In step 714, if the history of a trigger variable/expression is not to be stored, then in step 720, the watch is handled in the normal way and the process returns, as in step 790.

If, during the execution of the program to be debugged, the program has not hit a watchpoint in step 712, the process checks to see if the program has executed a statement indicated as a breakpoint, as in step 730. If not, then in step 732, normal hook function processing occurs and the process returns in step 790. If, in step 730, a breakpoint has occurred and execution of the program continues, then in step 740, the process inquires if the restore flag has been set (step 642). If the restore flag has not been set, then normal breakpoint processing occurs in step 760. If, however, the restore flag was set, then in step 750, the process determines if the breakpoint is at the same location as the restore entry set in step 644. If so, then in step 752, the states of the trigger variable/expression and all attached variables/expressions are restored and stored in the history table. In step 754, the restore flag is removed and the breakpoint is removed and normal breakpoint processing ensues, as in step 760. If, however, in step 750, the breakpoint is not at the same location as the entry to be restored, then in step 756, the breakpoint is ignored and the process returns, as in step 790.

Thus, what has been disclosed is a method to trace a trigger variable/expression and user-selected attached variables/expressions such that when the trigger variable/expression being traced changes state, the state(s) of the trigger variable/expression and the attached variables/expressions are also saved, thus creating a snapshot. Storing the snapshot allows a programmer to restore the state of the trigger variable/expression to the program statements at which it changed or when its memory location was referenced. By restoring the values of the attached variables/expressions, the user can approximate the environment at the time that the change was made to the trigger variable/expression. This allows the user to essentially back up in time and debug the program. By choosing the right attached variables/expressions, whether they all be local variables or others, the programmer can put herself/himself right back into the situation where the problem appeared without having to reexcute the program.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

The embodiments of the invention in which an exclusive property or privilege is claimed are defined on follows:

1. An article of manufacture, comprising a non-transitory data storage medium tangibly embodying a program of machine readable instructions executable by an electronic processing apparatus to perform method steps for operating an electronic processing apparatus, said method steps comprising the steps of:
   (a) initiating a user interface to exchange data input/output with a user and an electronic processing apparatus;
   (b) requesting and receiving a trigger expression from a user, said trigger expression representing a non-executable data value having a state;
   (c) requesting and receiving a program identification of a program in which the trigger expression is to be traced, said trigger expression resulting in an L value during the execution of said program;
   (d) causing the electronic processing apparatus to execute the identified program;
   (e) monitoring execution of the identified program without altering a logic flow of execution of said program to detect occurrences of a plurality of references to a location in memory representing a state of said trigger expression, wherein each said occurrence of a reference to a location in memory representing a state of said trigger expression occurs as a result of executing the identified program;
   (f) responsive to each detected occurrence of a reference to said location in memory representing a state of said trigger expression, storing the respective state of the trigger expression at the time of the respective detected occurrence of a reference to said location in memory presenting a state of the trigger expression to create a corresponding respective snapshot, said snapshots forming a history of said trigger expression during execution of the identified program, said storing step being performed without interrupting or otherwise stopping execution of the identified program;
   (g) maintaining the capability to restore each snapshot and display each snapshot to the user.

2. The article of manufacture of claim 1, further comprising:
   (a) requesting the user to assign conditions to the trigger expression whereupon when the conditions are satisfied, a snapshot of the trigger expression is stored.

3. The article of manufacture of claim 1, further comprising:
   (a) requesting the user to indicate attached expression whose states are also stored in a corresponding snapshot whenever a snapshot is stored for the trigger expression.

4. A digital data processing device, comprising:
   (a) at least one processor;
   (b) a memory functionally connected to said at least one processor;
   (c) a first computer program executable by said at least one processor;
   (d) at least one input device receiving input from a user and at least one output device for presenting output to a user;

(e) a second computer program for tracing said first computer program, said second computer program: (i) receiving a specification of a trigger expression resulting in an L value during execution of said first computer program from said user using said at least one input device, said trigger expression representing a non-executable data value having a state; (ii) responsive to receiving a specification of a trigger expression, monitoring execution of said first computer program, without altering a logic flow of execution of said first computer program, to detect occurrences of a plurality of references to a location in said memory representing a value of said trigger expression, wherein each said occurrence of a reference to a location in said memory representing a value of said trigger expression occurs as a result of executing said first computer program; (iii) responsive to each detected occurrence of a reference to said location in said memory representing a value of said trigger expression, storing a corresponding snapshot containing state data of said first computer program, said state data including said trigger expression, said storing step being performed without interrupting said first computer program; (iv) creating a history of said trigger expression during execution of said first program from said snapshots; and (v) presenting said history to said user using said at least one output device.

5. The digital data processing device of claim 4, wherein said second computer program further receives a specification of at least one condition for capturing said snapshot, and performs said step of storing a corresponding snapshot containing state data of said first computer program only if said at least one condition is satisfied.

6. The digital data processing device of claim 4, wherein said second computer program further received a specification of at least one attachment expression, and responsive thereto, includes said at least one attachment expression in said state data.

7. The digital data processing device of claim 4, wherein the first computer program and the second computer program execute on the same computer.

8. The digital data processing device of claim 4, wherein the first computer program and the second computer program execute on separate units connected by a data communications link.

* * * * *